United States Patent [19]
Reed et al.

[11] Patent Number: 5,455,702
[45] Date of Patent: Oct. 3, 1995

[54] LIGHT COMMUNICATION APPARATUS

[76] Inventors: Clay R. Reed, 13456 Gilbert St., N. Edwards, Calif. 93523; Michael D. Reed, 1750 N. Walnut, Lot 32, Las Vegas, Nev. 89115

[21] Appl. No.: 21,172

[22] Filed: Feb. 22, 1993

[51] Int. Cl.$^6$ .................................................. H04B 10/00
[52] U.S. Cl. ........................ 359/152; 359/154; 359/159
[58] Field of Search ................................ 359/154, 159, 359/132, 130, 152, 230, 600, 611; 340/825.72

[56] References Cited

U.S. PATENT DOCUMENTS

| | | | |
|---|---|---|---|
| 3,277,303 | 10/1966 | Jensen et al. | 359/159 |
| 4,049,295 | 9/1977 | Piers | 285/9 |
| 4,054,290 | 10/1977 | Villa | 359/230 |
| 4,126,375 | 11/1978 | Bull et al. | 359/611 |
| 4,330,204 | 5/1982 | Dye | 359/159 |
| 4,603,975 | 8/1986 | Cinzori | 359/159 |
| 4,729,649 | 3/1988 | Thompson | 359/611 |
| 5,115,350 | 5/1992 | Tanaka | 359/611 |
| 5,201,135 | 4/1993 | Cowles | 359/600 |
| 5,253,068 | 10/1993 | Crook et al. | 340/825.72 |

*Primary Examiner*—Leo H. Boudreau
*Assistant Examiner*—Bhavesh Mehta

[57] ABSTRACT

A housing is arranged to include a light transmitter and light receiver and associated circuitry to effect translation of incoming light pulses to an audio signal, and an audio signal input to light pulses for transmission.

2 Claims, 4 Drawing Sheets

LIGHT COMMUNICATION APPARATUS

BACKGROUND OF THE INVENTION

1. Field of the Invention

The field of invention relates to communication apparatus, and more particularly pertains to a new and improved light communication apparatus wherein the same is arranged to modulate incoming light pulses to an audio signal and similarly modulate audio signal input to light pulses for transmission.

2. Description of the Prior Art

Communication structure employing light is indicated in the prior art in U.S. Pat. No. 5,044,107 to Holford wherein modulation structure is recited operative through various optical modulators to effect translation of optical signals.

SUMMARY OF THE INVENTION

In view of the foregoing disadvantages inherent in the known types of communication apparatus now present in the prior art, the present invention provides a light communication apparatus wherein the same is arranged to transmit and accept light pulses and effect their modulation and interpretation to audio signals. As such, the general purpose of the present invention, which will be described subsequently in greater detail.

To attain this, the present invention provides a housing arranged to include a light transmitter and light receiver and associated circuitry to effect translation of incoming light pulses to an audio signal, and an audio signal input to light pulses for transmission.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved light communication apparatus which has all the advantages of the prior art communication apparatus and none of the disadvantages.

It is another object of the present invention to provide a new and improved light communication apparatus which may be easily and efficiently manufactured and marketed.

It is a further object of the present invention to provide a new and improved light communication apparatus which is of a durable and reliable construction.

An even further object of the present invention is to provide a new and improved light communication apparatus which is susceptible of a low cost of manufacture with regard to both materials and labor, and which accordingly is then susceptible of low prices of sale to the consuming public, thereby making such light communication apparatus economically available to the buying public.

Still yet another object of the present invention is to provide a new and improved light communication apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
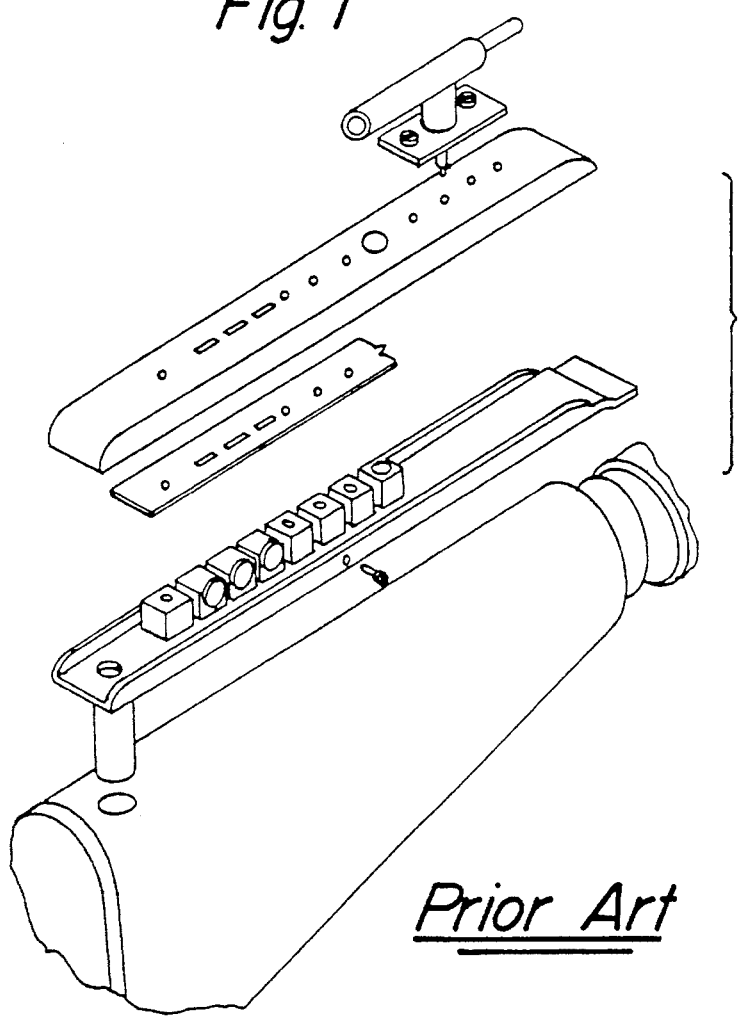
FIG. 1 is an isometric illustration of a prior art light transmission structure, as indicated in U.S. Pat. No. 5,044,107 converting light transmission to radio signals.
Figure 2:
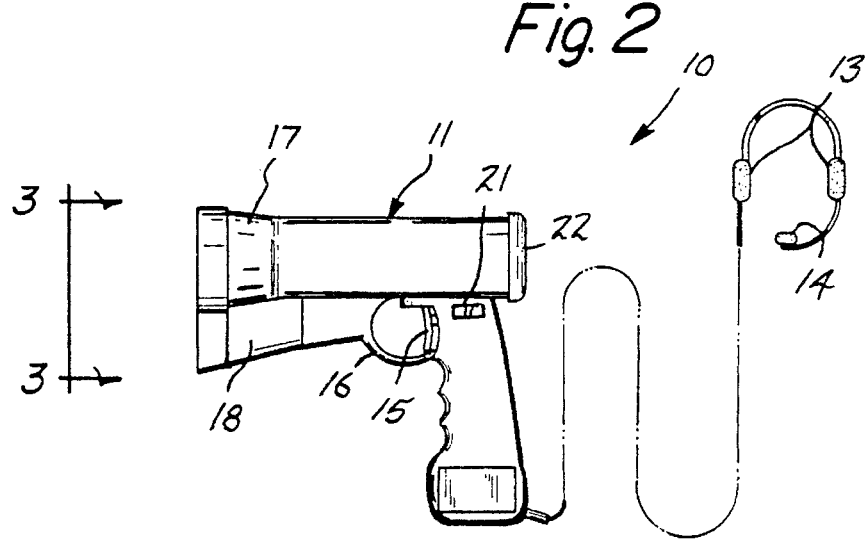
FIG. 2 is an orthographic view of the apparatus.
Figure 3:
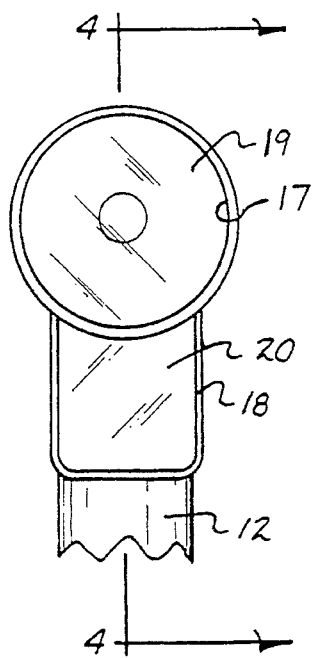
FIG. 3 is an orthographic view, taken along the lines 3—3 of FIG. 2 in the direction indicated by the arrows.
Figure 4:
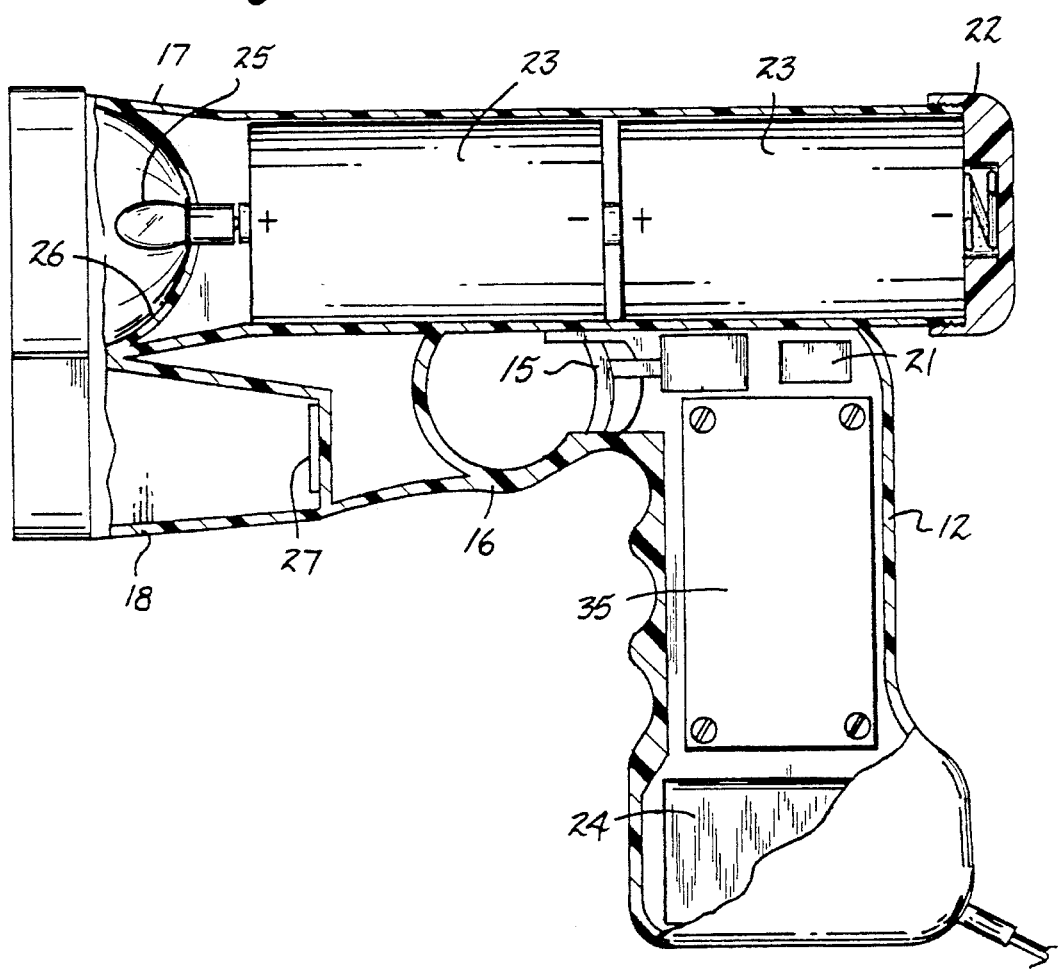
FIG. 4 is an orthographic view, taken along the lines 4—4 of FIG. 3 in the direction indicated by the arrows.

With reference now to the drawings, and in particular to FIGS. 1 to 7 thereof, a new and improved light communication apparatus embodying the principles and concepts of the present invention and generally designated by the reference numeral 10 will be described.

More specifically, the light communication apparatus 10 of the instant invention includes a primary housing 11 having a housing pistol grip 12 configured at an oblique angle relative to the primary housing, with earphones 13 mounting microphone 14 mounted by means of a communication cable to the pistol grip portion of the housing structure, with a first switch 15 configured as a trigger 15 mounted within a trigger guard loop 16 directed about the primary housing 11. A light transmission tube 17 is coaxially aligned with an oriented in a coextensive relationship relative to a light receiving tube 18 projecting through a forward end of the primary housing 11, with the light transmission tube 17 mounting a first lens 19 and the light receiving tube 18 mounting a second lens 20, with each lens at a free distal end of the respective light and receiving tube structure 17 and 18 respectively. A second switch 21 is mounted at an intersection of the primary housing of the pistol grip configured as an on/off switch 21 relative to the operative circuitry employed by the invention mounted within a control circuit housing 35 within the pistol grip 12 in adjacency to a second battery 24 relative to first batteries 23 mounted within the primary housing 11 in electrical communication with an illumination transmitter bulb 25 positioned within a concave reflector 26 within the light transmission tube 17.

Figure 6:
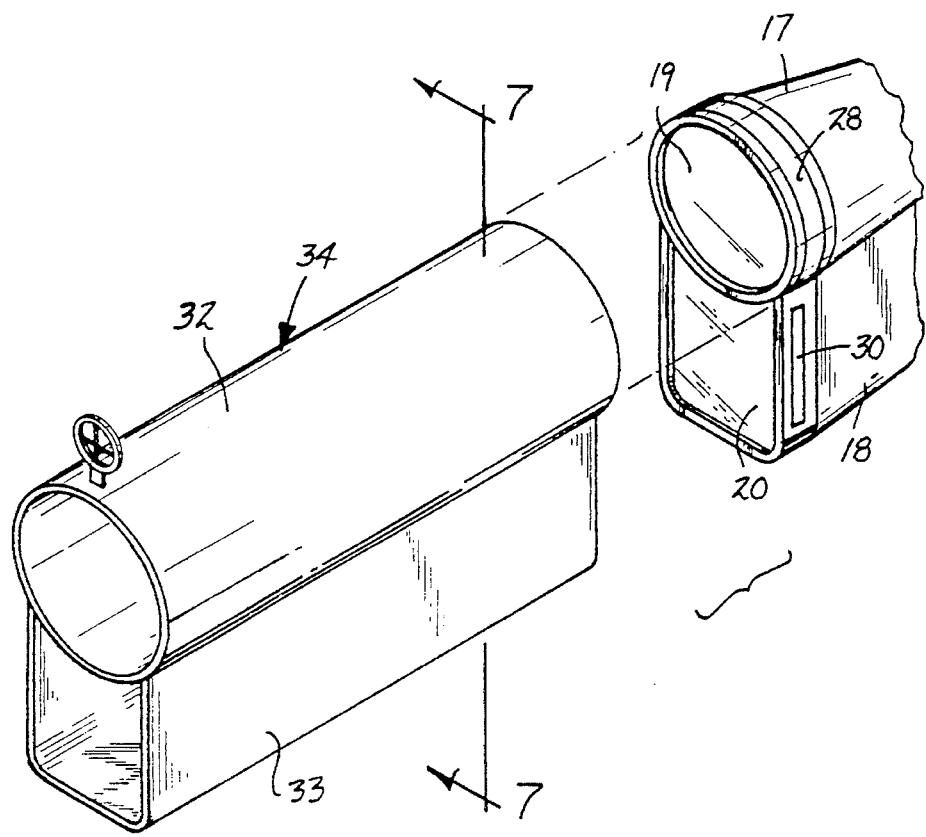
FIG. 6 is an isometric illustration of an extension housing employed by the invention.
Figure 7:
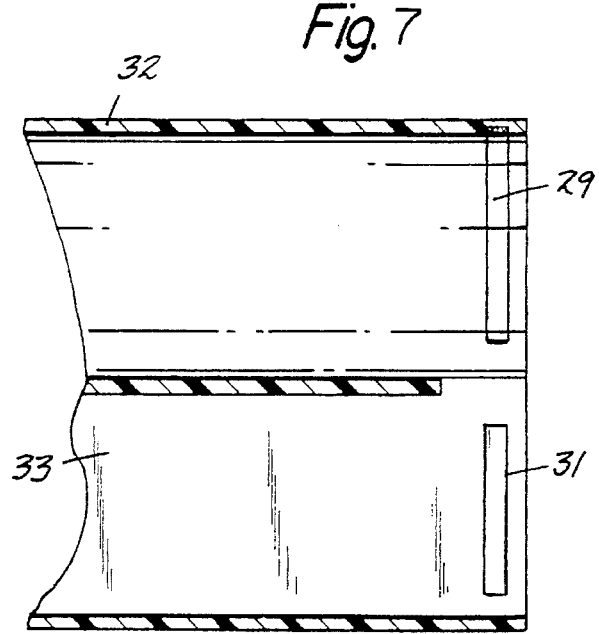
FIG. 7 is an orthographic view, taken along the lines 7—7 of FIG. 6 in the direction indicated by the arrows.

To prevent ambient light interference entering the second lens 20 and for effecting shielding of the light transmission tube 17, a unitary extension housing 34 is provided, as indicated in FIG. 6, having a first extension tube 32 parallel to and coextensive with a second extension tube 33. The first and second extension tubes includes respective first and second magnetic strips 29 and 31 respectively arranged for securement to respective first and second ferrous bands 28 and 30 mounted to the respective transmission receiving tubes 17 and 18 adjacent the respective first and second lenses 19 and 20 to permit the ease of mounting of the extension housing 34 relative to the primary housing 11.

Figure 5:
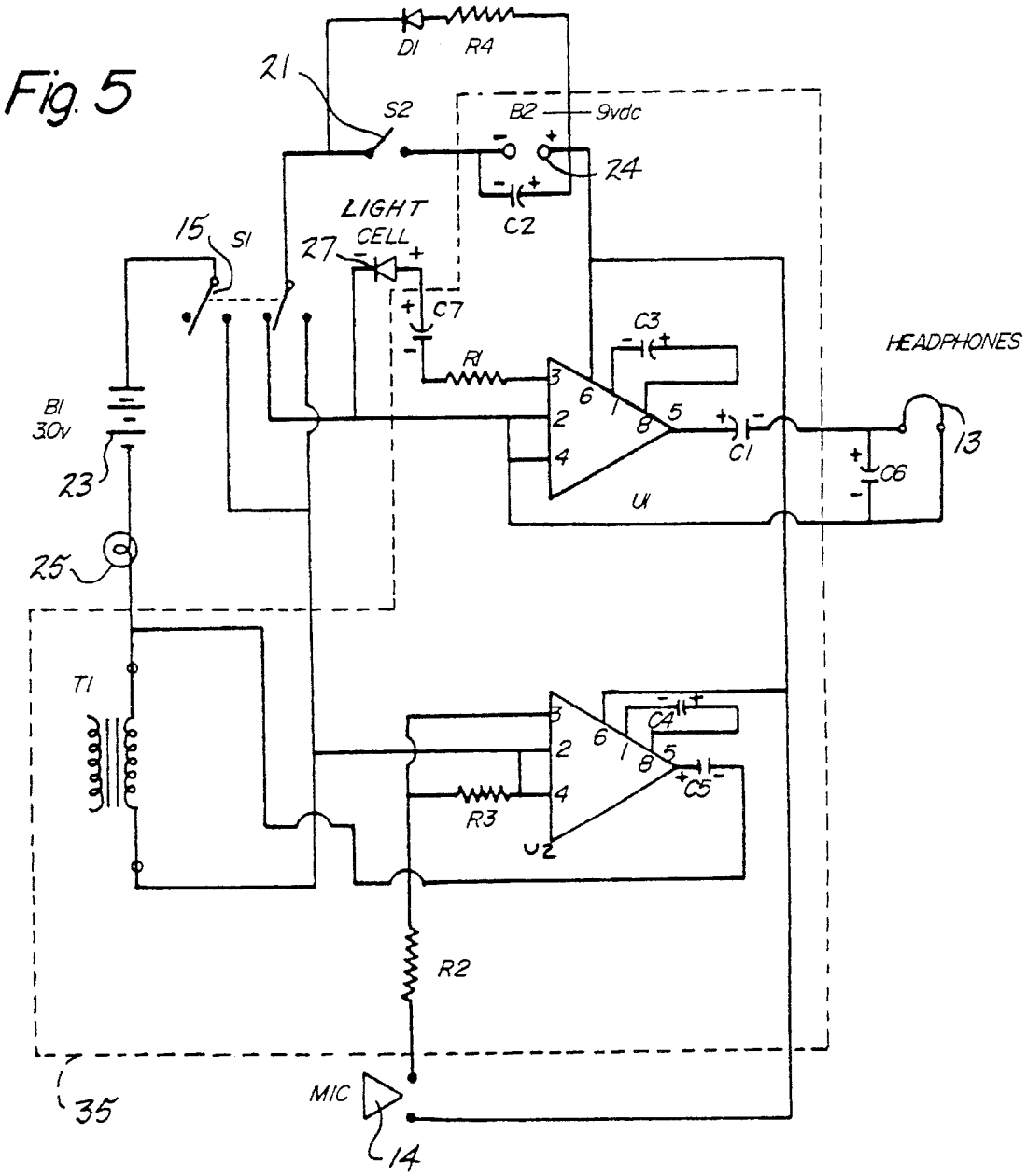
FIG. 5 is a diagrammatic illustration of the circuitry employed by the invention.

The control circuit housing 35, as indicated in FIG. 5, includes the second battery 24 parallel to the capacitor, whereupon actuation and closure of the second switch 21. Upon closure of the first switch 15, power is applied to the integrated circuits indicated as U-1 and U-2 respectively. The earphones 13 and the microphone 14 are provided wherein the earphones 13 are in operative communication with the integrated circuit U-1 through the capacitor 1 and the capacitor 6 to provide for proper charging of the capacitors to provide for transmission to the earphones 13, with the capacitor 1 arranged in series between the integrated circuit U-1 and the earphones 13, while the capacitor 6 is oriented in a parallel relationship relative to the earphones 13 and integrated circuit U-1. The FIGS. C-3 and C-4 respectively are operatively connected to the integrated circuits U-1 and U-2 respectively and are arranged to charge up for actuation of the earphones and microphone circuitry. The integrated circuits U-1 and U-2 respectively are provided for the respective receiving and transmission functions. Should switch 15 or S-1 be opened, then transmission to the earphones 13 through the integrated circuit U-1 is availed as the light cell or light receiving grid 27 is arranged in operative communication with the integrated circuit U-1 to receive such transmission. The switch 1 or trigger 15 is closed, power is directed to the integrated circuit U sub 2 in operative communication with a microphone 14 such that energy sensed to the integrated circuit U-2 will cause modulation pulses to be sent out to the transformer T-1. The transformer will expand and collapse to modulate the bulb 25 at much higher intensity and that signal of a pulsating light will be transmitted to another individual's receiving tube 18 of an identical unit, as indicated by the FIG. 4 for example. Further, the light cell 27 or receiver grid 27 receiving pulses from another individual's unit or light transmission tube 17 is such that the receiving pulses of light are converted to pulsating inputs to the reception integrated circuit U sub 1 and are demodulated to produce a signal that is audible and directed to the earphones 13. The resistors R sub 1, R sub 2, R sub 3, and R sub 4 are provided to control voltage through the transmission lines as required for proper operation of the invention. B1 or batteries 23 are typically two 1.5 volt cells, with the battery B sub 2 of a nine volt construction. The capacitors 2, 3, 4, and 6 are ten microfarad electrical capacitors, wherein capacitors 1 and 5 are 220 micro-farad electrical capacitors. The diode D-1 arranged in parallel relative to the switch 2 is illuminated upon closure of the switch 2 to indicate such closure. The integrated circuits U-1 and U-2 are of LN-386 audio amplifier types, with the transformer of an audio output configuration. The solar or light cell 27 is typically of a 0.5 voltage capacity, as employed, and the resistors 1 and 2 are of 1-K ohm construction, while the resistors 3 and 4 are of a 330 ohm configuration.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A light communication apparatus, comprising, a primary housing, the primary housing including a pistol grip mounted to the primary housing at an oblique included angle, wherein earphone members including a microphone positioned medially of and below the earphones are in electrical communication into the pistol grip, with the pistol grip including a control circuit housing, and a first switch and a second switch mounted to the pistol grip in adjacency to the primary housing, wherein the second switch is arranged to provide for electrical communication between the control circuit housing and the earphones and microphone, and wherein the primary housing includes a light transmission tube and a light receiving tube arranged in a parallel coextensive relationship relative to one another, with the light transmission tube including a transmitter bulb mounted within a concave reflector, and the light transmission tube including a first lens at a free distal end of the light transmission tube, and the light receiving tube including a light receiving grid mounted within the light receiving tube, and the light receiving tube having a second lens mounted adjacent a free distal end of the light receiving tube, and wherein the first switch is arranged in electrical communication between the control circuit housing and the transmitter bulb to effect pulsed transmission of illumination from the transmitter bulb, and wherein the first switch includes a trigger guard loop affording protective surrounding relationship relative to the first switch;

a unitary extension housing, wherein the unitary extension housing includes a first extension tube and a second extension tube arranged in a parallel coextensive relationship, and wherein the first extension tube includes a first extension tube first end and the second extension tube includes a second extension tube first end, and the first extension tube first end includes a first magnetic strip and the second extension tube includes a second magnetic strip, and wherein the light transmission tube includes a first ferrous band and the light receiving tube includes a second ferrous band, wherein the first ferrous band and the second ferrous band are arranged for magnetic adherence to the first magnetic strip and the second magnetic strip respectively for positioning and securing the unitary extension housing in a colinear relationship relative to the primary housing.

2. An apparatus as set forth in claim 1 wherein the primary housing includes a first battery member, and wherein the pistol grip includes a second battery member, and the control circuit housing is arranged in electrical communication between the first battery member and the second battery member, and wherein the control circuit housing includes a first integrated circuit in electrical communication between the earphones and the second switch, and wherein the light receiver grid is arranged in electrical communication with the first integrated circuit to modulate light pulses to audio signals to the earphones, and wherein a second integrated circuit is arranged in electrical communication between the microphone and a transformer, and wherein the transmitter bulb is arranged in electrical communication between the transformer and the first battery to effect pulsed signals directed to the transmitter bulb.

\* \* \* \* \*